(12) United States Patent
Sugiura et al.

(10) Patent No.: US 9,983,068 B2
(45) Date of Patent: May 29, 2018

(54) OVERHEAT DETECTION CIRCUIT AND SEMICONDUCTOR DEVICE

(71) Applicant: Seiko Instruments Inc., Chiba-shi, Chiba (JP)

(72) Inventors: Masakazu Sugiura, Chiba (JP); Hideyuki Sawai, Chiba (JP)

(73) Assignee: ABLIC INC., Chiba (JP)

( * ) Notice: Subject to any disclaimer, the term of this patent is extended or adjusted under 35 U.S.C. 154(b) by 302 days.

(21) Appl. No.: 14/969,653

(22) Filed: Dec. 15, 2015

(65) Prior Publication Data
US 2016/0187203 A1 Jun. 30, 2016

(30) Foreign Application Priority Data
Dec. 24, 2014 (JP) .................. 2014-260737

(51) Int. Cl.
*G01K 7/00* (2006.01)
*G01K 15/00* (2006.01)
*G01K 7/01* (2006.01)
*G01K 3/00* (2006.01)

(52) U.S. Cl.
CPC ............... *G01K 7/01* (2013.01); *G01K 3/005* (2013.01)

(58) Field of Classification Search
USPC ............... 374/178, 170, 1; 327/512
See application file for complete search history.

(56) References Cited

U.S. PATENT DOCUMENTS

| | | | | |
|---|---|---|---|---|
| 5,070,322 A | * | 12/1991 | Fujihira | G01K 7/01 257/470 |
| 5,982,221 A | * | 11/1999 | Tuthill | G01K 7/01 257/E23.08 |
| 6,637,934 B1 | * | 10/2003 | Henderson | G01K 1/028 326/82 |
| 6,910,804 B2 | * | 6/2005 | Mattoon | G01K 1/026 374/1 |
| 7,413,342 B2 | * | 8/2008 | Mukherjee | G01K 1/026 327/512 |
| 7,429,129 B2 | * | 9/2008 | St. Pierre | G01K 7/01 327/512 |
| 7,643,889 B2 | * | 1/2010 | Jeong | G01K 7/01 324/224 |
| 7,880,528 B2 | | 2/2011 | Igarashi | |
| 7,936,203 B2 | * | 5/2011 | Zimlich | H03L 7/0814 327/512 |
| 7,977,999 B2 | * | 7/2011 | Igarashi | G01K 7/01 327/512 |
| 8,096,707 B2 | * | 1/2012 | Raychowdhury | G01K 7/015 374/170 |
| 8,197,133 B2 | * | 6/2012 | Schultz | G01F 1/6965 374/1 |

(Continued)

*Primary Examiner* — Mirellys Jagan
(74) *Attorney, Agent, or Firm* — Brinks Gilson & Lione

(57) ABSTRACT

Provided is an overheat detection circuit that is capable of quickly outputting an overheated state detection signal in an overheated state without outputting an unintended erroneous output caused by disturbance noise, such as momentary voltage fluctuations in the power supply. The overheat detection circuit includes: a temperature sensor; a comparison section; and a disturbance noise removal section configured to output an overheated state detection signal to an output section after a predetermined delay time has elapsed. The delay time is reduced in proportion to temperature.

4 Claims, 4 Drawing Sheets

(56) References Cited

U.S. PATENT DOCUMENTS

| | | | |
|---|---|---|---|
| 2006/0018364 A1* | 1/2006 | Kim | G01K 1/028 374/183 |
| 2008/0031303 A1* | 2/2008 | Bowden | G01K 3/005 374/163 |
| 2009/0066404 A1* | 3/2009 | Heppenstall | G01K 7/01 327/513 |
| 2013/0147407 A1* | 6/2013 | Kawamura | H03K 17/0828 318/400.21 |
| 2014/0084311 A1* | 3/2014 | Takeda | H01L 25/0753 257/88 |

* cited by examiner

OVERHEAT DETECTION CIRCUIT AND SEMICONDUCTOR DEVICE

RELATED APPLICATIONS

This application claims priority under 35 U.S.C. § 119 to Japanese Patent Application No. 2014-260737 filed on Dec. 24, 2014, the entire content of which is hereby incorporated by reference.

BACKGROUND OF THE INVENTION

1. Field of the Invention

The present invention relates to an overheat detection circuit configured to detect an abnormal temperature of a semiconductor device.

2. Description of the Related Art

A related-art overheat detection circuit is illustrated in FIG. 2. The related-art overheat detection circuit includes a reference voltage section 210, a temperature sensor 211, and a comparison section 212. The temperature sensor 211 includes a current source 202 and a PN junction element 203 for sensing temperature. The comparison section 212 includes a comparator 204. An output of the comparator 204 is connected to an output terminal Vout of the overheat detection circuit.

In the related-art overheat detection circuit, the comparator 204 compares and determines a voltage generated at the PN junction element 203, and a reference voltage Vref output from a reference voltage circuit 210, to thereby output an overheated state detection signal.

In general, the voltage generated at the PN junction element 203 exhibits negative temperature characteristics, and hence when an ambient temperature increases and the voltage generated at the PN junction element 203 falls below the reference voltage Vref, the comparator 204 outputs the overheated state detection signal to the output terminal Vout of the overheat detection circuit.

However, the above-mentioned overheat detection circuit suffers from a problem in that when disturbance noise, such as momentary fluctuations in the power supply, occurs, the comparator 204 may erroneously output the overheated state detection signal.

SUMMARY OF THE INVENTION

The present invention has been made in order to solve the above-mentioned problem, and provides an overheat detection circuit configured to avoid an erroneous output caused by disturbance noise.

In order to solve the related-art problem, an overheat detection circuit according to one embodiment of the present invention is configured as follows.

The overheat detection circuit includes: a temperature sensor; a comparison section; and a disturbance noise removal section configured to output an overheated state detection signal to an output section after a predetermined delay time has elapsed, the delay time being reduced in proportion to temperature.

According to the overheat detection circuit of the one embodiment of the present invention, the overheat detection circuit may be provided that is capable of quickly outputting the overheated state detection signal in an overheated state without outputting an unintended erroneous output caused by disturbance noise, such as momentary fluctuations in the power supply.

DETAILED DESCRIPTION OF THE PREFERRED EMBODIMENT

Figure 1:
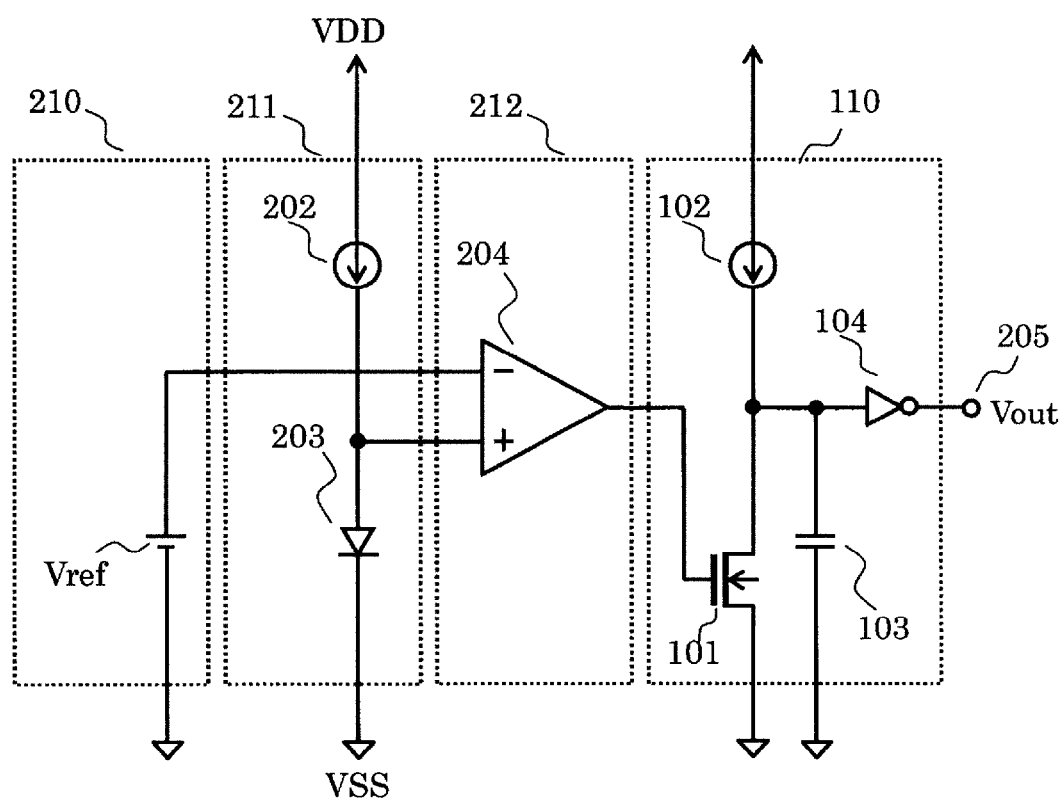
FIG. 1 is a circuit diagram of an overheat detection circuit according to one embodiment of the present invention.
Figure 2:
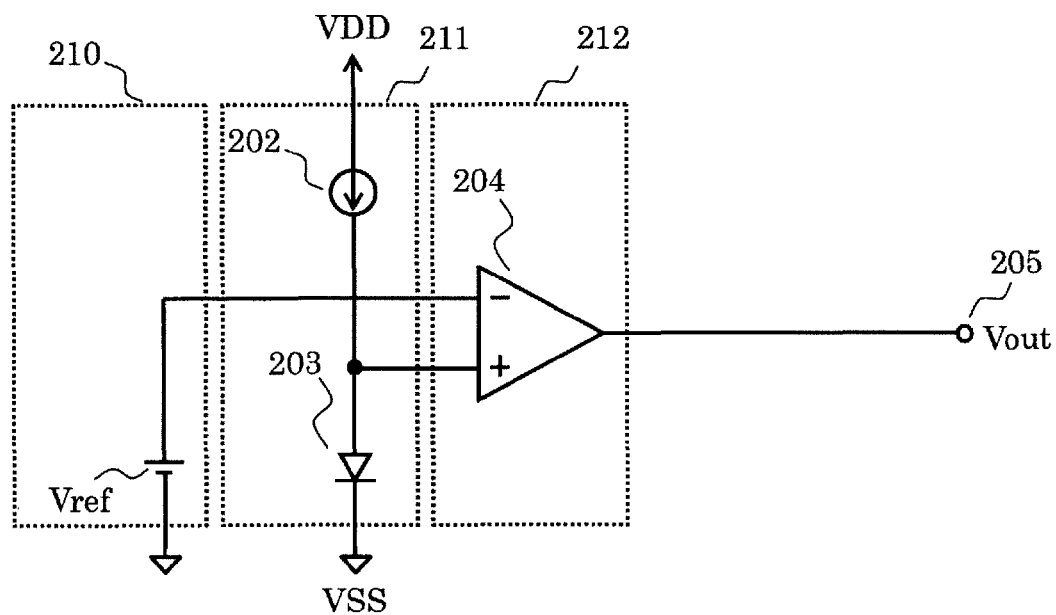
FIG. 2 is a circuit diagram relating to a related-art overheat detection circuit.

FIG. 1 is a circuit diagram of an overheat detection circuit according to one embodiment of the present invention.

The overheat detection circuit of this embodiment includes a reference voltage section 210, a temperature sensor 211, a comparison section 212, and a disturbance noise removal section 110. The temperature sensor 211 includes a current source 202 and a PN junction element 203 for sensing temperature. The comparison section 212 includes a comparator 204. The disturbance noise removal section 110 includes an N-channel transistor 101, a current source 102, a capacitor 103, and an inverter 104.

The current source 202 and the PN junction element 203 are connected in series between a power supply terminal and a ground terminal. The comparator 204 has an inverting input terminal connected to an output terminal of the reference voltage section 210, and a non-inverting input terminal connected to a node between the current source 202 and the PN junction element 203. The N-channel transistor 101 has a control terminal connected to an output terminal of the comparator 204, and a source connected to the ground terminal. The current source 102 and the capacitor 103 are connected between the power supply terminal and the ground terminal. The inverter 104 has an input terminal connected to a node between the current source 102 and the capacitor 103, and an output terminal connected to an output terminal Vout of the overheat detection circuit.

Next, the operation of the overheat detection circuit of this embodiment is described.

In general, the voltage generated at the PN junction element 203 exhibits negative temperature characteristics. When the ambient temperature increases and the voltage generated at the PN junction element 203 falls below a reference voltage Vref, the comparator 204 outputs an overheated state detection signal (Low level) to the control terminal of the N-channel transistor 101. The N-channel transistor 101 is off, and hence the capacitor 103 is charged by current from the current source 102. When the voltage generated at the capacitor 103 increases and reaches a threshold voltage of the inverter 104, the overheated state detection signal (Low level) is output to the output terminal Vout of the overheat detection circuit.

In this case, for example, due to disturbance noise, such as momentary voltage fluctuations in the power supply, there are cases in which the comparator 204 erroneously outputs the overheated state detection signal. In such a case, the capacitor 103 is charged as a result of the overheated state detection signal. However, unless the overheated state detection signal continues for a period of time longer than that required in order for the voltage of the capacitor 103 to reach the threshold voltage of the inverter 104, the overheated state detection signal is not output to the output terminal_

Vout of the overheat detection circuit. In other words, an overheat detection circuit that avoids an erroneous output caused by disturbance noise can be provided by giving the period of time required in order to charge the capacitor 103 as a period of time within which the effects of disturbance noise can be removed.

On the other hand, in an overheated state, the signal indicating the overheated state needs to be output quickly. Consequently, the overheat detection circuit according to this embodiment is configured to shorten, in proportion to temperature, the time within which the effects of disturbance noise can be removed.

More specifically, the overheat detection circuit is configured to increase the current of the current source 102 in proportion to temperature. As a result, the capacitor 103 is charged more quickly as the temperature increases, which allows the overheated state detection signal to be output quickly in an overheated state.

Figure 3A:
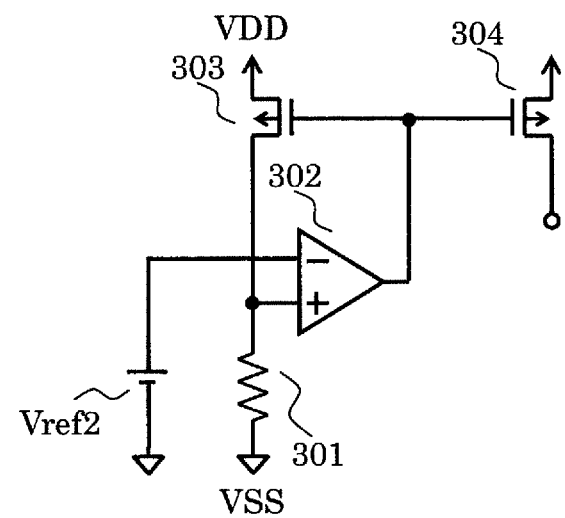
FIG. 3A and FIG. 3B are circuit diagrams for illustrating a current source of the overheat detection circuit according to the embodiment the present invention.
Figure 3B:
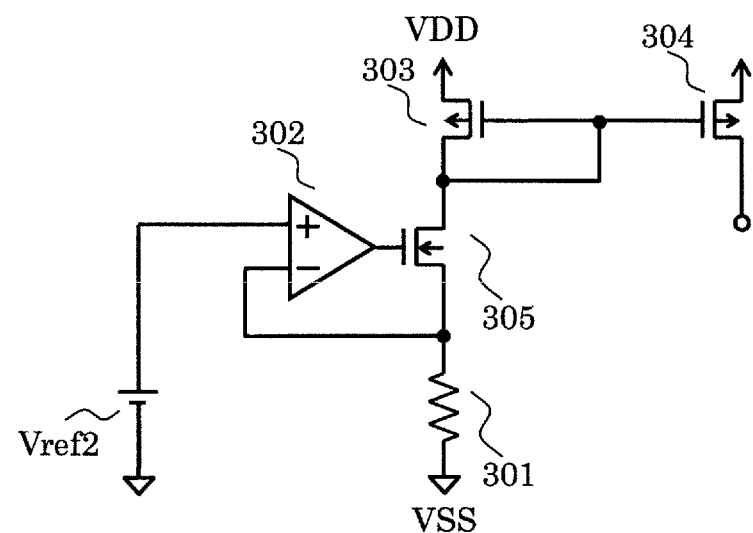

FIG. 3A and FIG. 3B are circuit diagrams of the current source 102, in which output current increases in proportion to temperature based on resistance, the resistance value decreasing in proportion to temperature.

In FIG. 3A, a P-channel transistor 303 and a resistor 301 are connected in series. A difference between a reference voltage Vref2 and the voltage of a node between the P-channel transistor 303 and the resistor 301 is amplified by an amplifier 302, and the amplified output is input to a gate of the P-channel transistor 303. A P-channel transistor 304 is connected by a current mirror to the P-channel transistor 303. The current flowing through the P-channel transistor 304 is the output current of the current source 102.

In this case, a current inversely proportional to the resistance value of the resistor 301 flows through the P-channel transistor 303. As a result, the current flowing through the P-channel transistor 304, which is in a current mirror relationship with the P-channel transistor 303, namely, the current of the current source 102, increases in proportion to temperature.

In contrast to FIG. 3A, an N-channel transistor 305 is connected between the P-channel transistor 303 and the resistor 301 in FIG. 3B. A difference between the reference voltage Vref2 and the voltage of a node between the N-channel transistor 305 and the resistor 301 is amplified by the amplifier 302, and the amplified output is input to a gate of the N-channel transistor 305. A drain and the gate of the P-channel transistor 303 are connected to each other.

In this case, a current inversely proportional to the resistance value of the resistor 301 flows through the P-channel transistor 303. As a result, the current flowing through the P-channel transistor 304, which is in a current mirror relationship with the P-channel transistor 303, namely, the current of the current source 102, increases in proportion to temperature.

Note that, FIG. 3A and FIG. 3B are illustrations of examples in which the current of the current source 102 increases in proportion to temperature based on resistance, the resistance value decreasing in proportion to temperature. However, the present invention is not necessarily limited to this mode.

Figure 4:
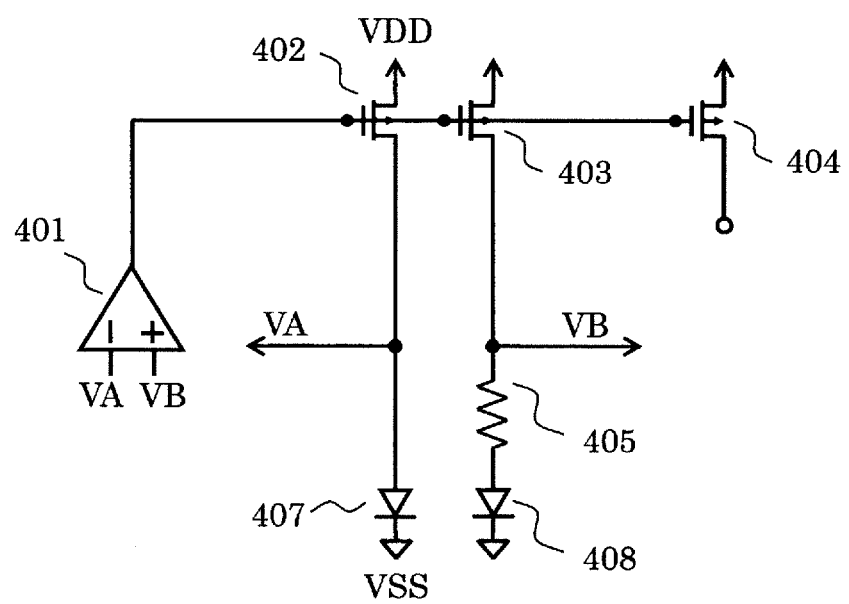
FIG. 4 is a circuit diagram for illustrating another example of a current source of the overheat detection circuit according to the embodiment of the present invention.

FIG. 4 is a circuit diagram of the current source 102, in which output current increases in proportion to temperature based on thermal voltage.

A P-channel transistor 402 and a PN junction element 407 are connected in series between a power supply terminal and a ground terminal. A P-channel transistor 403, a resistor 405, and a PN junction element 408 are connected in series between a power supply terminal and a ground terminal. An amplifier 401 is configured to amplify a difference between a voltage VA of a node between the P-channel transistor 402 and the PN junction element 407 and a voltage VB of a node between the P-channel transistor 403 and the resistor 405, and input the amplified output voltage to the gates of the P-channel transistors 402, 403, and 404.

Through the P-channel transistor 402 and the P-channel transistor 403, a current proportional to the thermal voltage flows. The thermal voltage is proportional to temperature, and hence the current of the P-channel transistor 402 and the P-channel transistor 403 exhibits positive temperature characteristics. The current of the current source 102 can be made to exhibit positive temperature characteristics by using the P-channel transistor 404, which is in a current mirror relationship with the P-channel transistor 402 and the P-channel transistor 403, as the current source 102.

Note that, FIG. 4 is an illustration of an example in which the current of the current source 102 can be made to exhibit positive temperature characteristics based on thermal voltage. However, the present invention is not necessarily limited to this mode.

As described above, according to the overheat detection circuit of this embodiment, an overheat detection circuit can be provided that is capable of avoiding an erroneous output caused by disturbance noise, without problems occurring in a function for quickly outputting an overheated state detection signal.

In the overheat detection circuit according to this embodiment as described above, the current of the current source 102 increases in proportion to temperature. However, the overheat detection circuit may also be configured such that the threshold voltage of the inverter 104 decreases in proportion to temperature. For example, the threshold voltage of the inverter 104 may be determined to be about the threshold voltage of the N-channel transistor by increasing the aspect ratio of the N-channel transistor forming the inverter 104 to increase a drive power. In other words, the threshold voltage of the N-channel transistor usually decreases in proportion to temperature, and hence the overheat detection circuit can be configured such that the threshold voltage of the inverter 104 decreases in proportion to temperature. The circuit described above is an example, and the present invention is not necessarily limited to this mode.

What is claimed is:

1. An overheat detection circuit, comprising:
   a temperature sensor;
   a comparison section connected to the temperature sensor; and
   a disturbance noise removal section connected to the comparison section and configured to output an overheated state detection signal to an output section after a predetermined delay time has elapsed,
   the delay time being reduced in proportion to temperature.

2. An overheat detection circuit according to claim 1, wherein the disturbance noise removal section comprises:
   a current source; and
   a capacitor, the current source and the capacitor being connected in series,
   wherein the disturbance noise removal section is configured to output the overheated state detection signal based on a charge stored in the capacitor, and
   wherein a current of the current source increases in proportion to temperature.

3. An overheat detection circuit according to claim 1, wherein the disturbance noise removal section comprises:
   a current source;

a capacitor, the current source and the capacitor being connected in series; and an inverter configured to receive a voltage of a node between the current source and the capacitor and having an output connected to an output terminal of the overheat detection circuit, wherein the disturbance noise removal section is configured to output the overheated state detection signal based on a charge stored in the capacitor, and wherein a threshold voltage of the inverter decreases in proportion to temperature.

4. A semiconductor device, comprising the overheat detection circuit of claim 1.

* * * * *